No. 622,391. Patented Apr. 4, 1899.
T. RANKIN & J. J. BUSENBENZ.
ROLLER FOR ROLLER SKATES.
(Application filed Feb. 1, 1898.)
(No Model.)
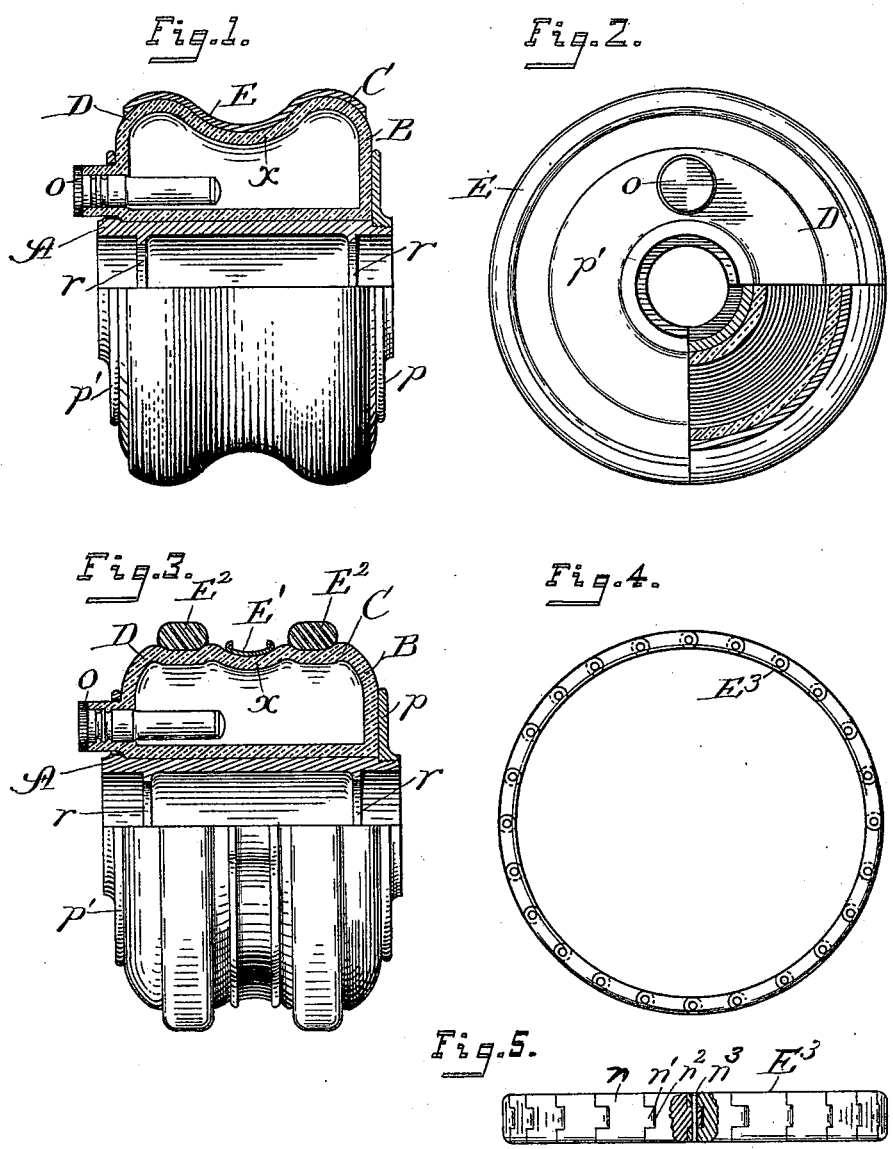
Witnesses:
Ray Hutchins
Ida M. Crary
Inventors:
Thomas Rankin,
Jacob J. Busenbenz
By Dyrenforth & Dyrenforth,
Attys.

UNITED STATES PATENT OFFICE.

THOMAS RANKIN AND JACOB J. BUSENBENZ, OF CHICAGO, ILLINOIS, ASSIGNORS TO THE CHICAGO BUILDING AND MANUFACTURING COMPANY, OF SAME PLACE.

ROLLER FOR ROLLER-SKATES.

SPECIFICATION forming part of Letters Patent No. 622,391, dated April 4, 1899.

Application filed February 1, 1898. Serial No. 668,717. (No model.)

*To all whom it may concern:*

Be it known that we, THOMAS RANKIN and JACOB J. BUSENBENZ, citizens of the United States, residing at Chicago, in the county of Cook and State of Illinois, have invented a new and useful Improvement in Rollers for Roller-Skates, of which the following is a specification.

Our invention relates to an improvement in the class of pneumatic-tired rollers for roller-skates.

Our object is to provide a construction of double-tread pneumatic-tired rollers for roller-skates which shall not only afford the noiseless and cushioning effect of the pneumatic tire, but which shall be exceptionally durable and be rendered speedy by preventing the clinging and consequent retarding tendency of the rubber of which the tire is composed.

Referring to the accompanying drawings, Figure 1 shows our improved roller by a view in perimetrical elevation, partly sectional. Fig. 2 is a view of the same in side elevation, partly sectional; Fig. 3, a view like that presented by Fig. 1, but showing a modified construction; Fig. 4, an edge view of an annular band formed of metal links as a substitute for the tread-rings represented in Fig. 3, and Fig. 5 a broken plan view of the same.

A is the hub of the roller, which should be formed of metal and may be hollow, as shown, with internal bracing-webs $r$ $r$ near its opposite ends, on one of which is a permanent annular flange $p'$ and on the other of which is screwed a flanged nut $p$, affording lateral confining means for the pneumatic tire B. The rubber tire may involve any well-known or suitable general construction and is seated about the hub between the flanges $p'$ and $p$ and equipped with a suitable valve $o$ for inflating it. About the center of the periphery of the tire it is depressed, as shown at $x$, by encircling it with means for there confining it, whereby when the tire is inflated it will protrude about opposite sides of this center and afford the two lateral tread portions C and D. The confining means may comprise a single continuous adequately-rigid band E (shown in Fig. 1) of the undulatory shape in cross-section illustrated secured about the tire to cause it when inflated to conform to the band and produce the depression flanked by the tread portions referred to, which latter it covers and protects, and the band being composed by preference of properly-molded rawhide (though it may be sheet metal or other suitable non-stretching material) it enhances the durability of these tread portions. If desired, the central confining-band may be, as represented at $E'$ in Fig. 3, narrower than the band E, and each tread portion C and D may be protected and reinforced by a separate annular band $E^2$, of rawhide or other suitable material, a desirable form being the band $E^3$, (illustrated in Figs. 4 and 5,) composed of metal links $n$, each having a tongue $n'$ at one edge entering a recess $n^2$ on the adjacent edge of the next link and at which they are pivotally connected by pins $n^3$.

What we claim as new, and desire to secure by Letters Patent, is—

1. A roller for roller-skates comprising, in combination, a hub provided at its opposite ends with tire-confining flanges, and a single pneumatic tire on said hub between the flanges contracted centrally to form two tread portions and bound about each tread portion with non-stretching material, substantially as described.

2. A roller for roller-skates comprising, in combination, a hub provided at its opposite ends with tire-confining flanges, a single pneumatic tire on said hub between the flanges and surrounded circumferentially by a band to form the tread portions C and D, and a band $E^2$ of non-stretching material, such as metal or rawhide, about each tread portion, substantially as and for the purpose set forth.

THOMAS RANKIN.
JACOB J. BUSENBENZ.

In presence of—
RAY HUTCHINS,
IDA CRARY.